United States Patent

[11] 3,594,554

[72] Inventor Arthur M. Pederson
Mercer Island, Wash.
[21] Appl. No. 831,950
[22] Filed June 10, 1969
[45] Patented July 20, 1971
[73] Assignee The United States of America as represented by the Secretary of the Navy

[54] DEPTH CONTROL SYSTEM FOR UNDERWATER VEHICLE
2 Claims, 2 Drawing Figs.

[52] U.S. Cl. .................................................. 235/150.2
[51] Int. Cl. .................................................. G06f 15/50, G06g 7/78
[50] Field of Search .................................. 235/150.2, 151.3, 61.5 T; 340/146.2, 29, 150; 23/388; 114/235.2, 25; 318/592, 594, 601, 603

[56] References Cited
UNITED STATES PATENTS
3,117,303 1/1964 Byrne ........................... 340/150 X
3,273,122 9/1966 Chandler ...................... 340/146.2
3,351,895 11/1967 Cupp et al. .................. 114/235.2 X
3,469,821 9/1969 Gross et al. ................. 114/235.2 X Primary Examiner—Malcolm A. Morrison
Assistant Examiner—Jerry Smith
Attorneys—Edgar J. Brower, H. H. Losche and Paul S. Collignon ABSTRACT: A depth control system for an underwater vehicle having a pressure transducer for providing a frequency output proportional to depth and having means for comparing the measured depth with a preset depth. The output frequency of the pressure transducer is accurately measured by a high frequency crystal-controlled oscillator and counter and this high frequency count is stored in a binary register and compared with a reference register to determine whether the pressure is greater, less than, or approximately equal to the preset value.

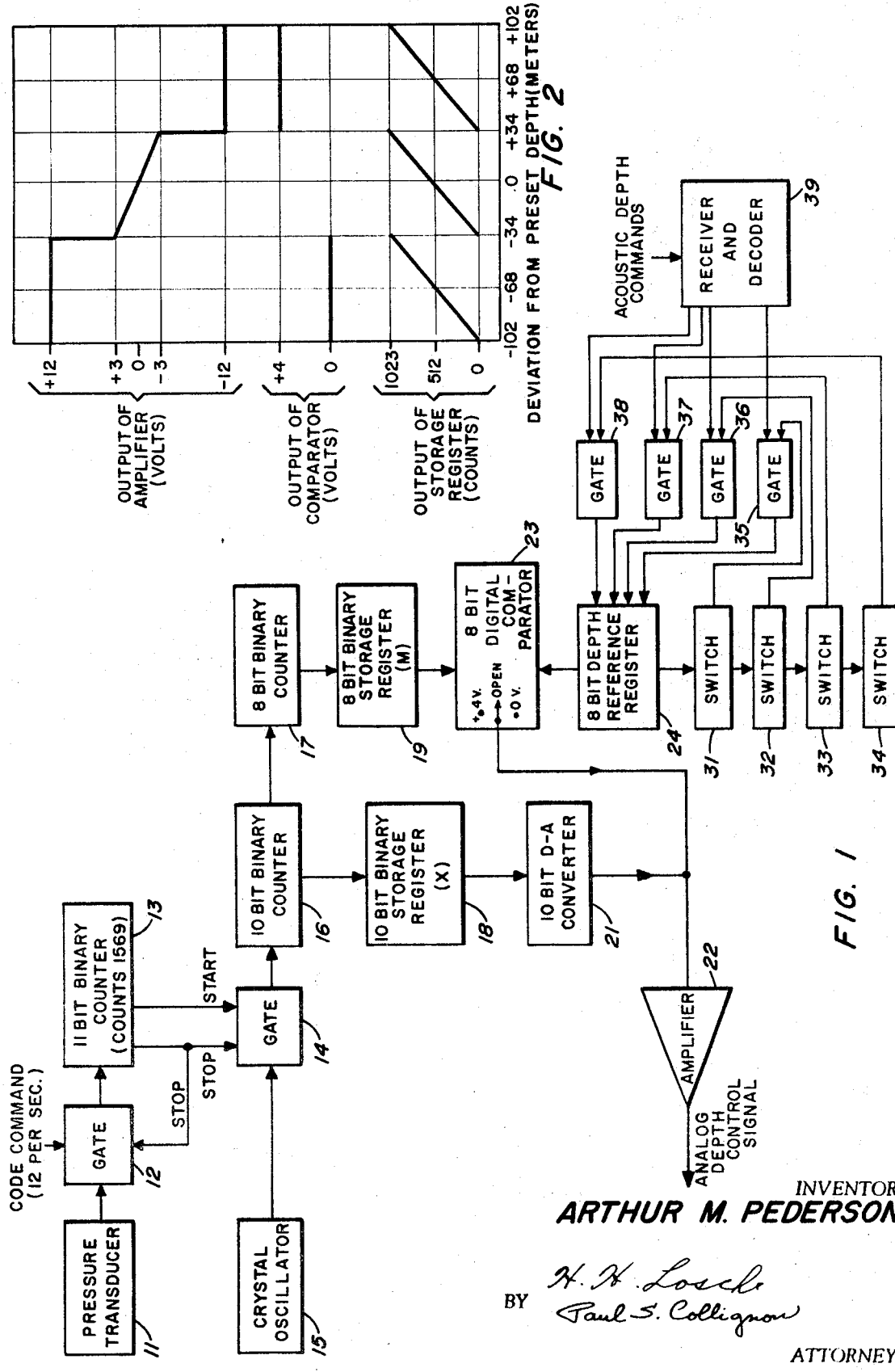

DEPTH CONTROL SYSTEM FOR UNDERWATER VEHICLE

BACKGROUND OF THE INVENTION

The present invention relates to a system for controlling and recording the depth of a self-propelled underwater research vehicle. Any one of various digitally preset operating depths may be utilized during an underwater run. The underwater vehicle, which might be used for various research purposes, is unmanned and the present invention provides a compact system for regulating the depth at which the vehicle travels.

SUMMARY OF THE INVENTION

The present invention utilizes the output frequency of a pressure transducer to generate a measurement period which is accurately measured by a high frequency crystal-controlled oscillator and counter. The high frequency count is then stored in an 18-bit binary register. The most significant 8 bits are compared with an 8-bit reference register to determine whether the pressure is greater, less than, or approximately equal to the preset value. If the two 8-bit registers are the same, the least significant 10 bits of the storage register are allowed to control a digital to analog converter which generates an error voltage proportional to the deviation from the preset depth.

BRIEF DESCRIPTION OF THE DRAWING

FIG. 1 is a block diagram of a preferred embodiment of the present invention; and FIG. 2 is a graphic illustration of waveforms showing outputs for various depths.

DESCRIPTION OF THE PREFERRED EMBODIMENT

Referring to FIG. 1 of the drawing, there is shown a pressure transducer 11 which provides a frequency output which is proportional to depth. By way of example, pressure transducer 11 might be a Vibrotron Pressure Transducer, which is manufactured by United Control of Redmond, Washington. As the Vibrotron Pressure Transducer is sensitive to temperature change, the transducer is preferably housed in a Constant Temperature Heater Chamber which is also manufactured by United Control. In an embodiment of the present invention which was built and tested at the Applied Physics Laboratory, University of Washington, in Seattle, Washington, pressure transducer 11 had a pressure range from 0 to 4500 p.s.i., with a corresponding frequency output range from 25.2 kHz. to 19.6 kHz.

The output ($f_v$) from pressure transducer 11 is gated by gate 12, which receives a start command every 1/12 second, and the output ($f_v$) is accumulated in a 11-bit binary counter 13. The first count of counter 13 opens gate 14 to pass the output of crystal oscillator 15, which has a frequency of 5,898,240 Hz. Counter 13 is designed to accumulate 1569 counts ($N_1$) and then closes gates 12 and 14. As the frequency of pressure transducer 11 varies between 25.2 kHz. at 0 p.s.i. and 19.6 kHz. at 4500 p.s.i., the count ($N_1$) of counter 13 was selected at 1569 which makes the sampling period = 62 ms for $f_v$=25.2 kHz. and T = 80 ms. for $f_v$=19.6 kHz. as:

(1) $T = N_1/f_v$.

As the longest period for T will be when $f_v$ is the smallest, that is, when $f_v$=19.6 kHz., the longest period for T will be 80 ms. thus assuring that counter 13 will complete its count within 1/12 of a second. It can thus be seen that counter 13 will complete its count before a new start command will be received by gate 12. Gate 14 is opened during period T and the output from oscillator 15 will be gated to an 18-bit counter which is shown as a 10-bit binary counter 16 and an 8-bit binary counter 17. The count accumulated in counters 16 and 17 during period T varies between 366,000 for T=62 ms and 472,000 for T=80 ms. As the maximum accumulation for an 18-bit counter is $2^{18}$ or 262,144, it can be seen that counters 16 and 17 will always fill and recycle once during T. The relationship between the 18-bit count ($N_2$) and $f_v$ is as follows:

(2) $$T = \frac{1569}{f_v} = \frac{N_2}{5,898,240}$$

and therefore (3) $$f_v = \frac{(1569)(5,898,240)}{N_2}$$

It is convenient to let $N_2$ be represented as follows: (4) $N_2 = (1024)(M+256)+X$
where M is the number accumulated in counter 17 during T, and 256 accounts for the fact that both counters 16 and 17 (18-bit) have recycled once. X represents the remaining count in counter 16 at the end of T. Combining equation (3) and (4) provides:

(5) $$f_v = \frac{(1569)(5,898,240)}{(1024)(M+256)+X}$$

At the end of period T, the numbers X and M are transferred to a 10-bit binary storage register 18 and an 8-bit binary storage register 19, respectively, for storage in order that counters 16 and 17 can be available for the next sample. Storage register 18 drives a digital to analog converter 21 (resistive ladder network) thus generating a voltage proportional to X. A differential input operational amplifier 22 is used to invert and shift the output of converter 21 so that a depth control signal is obtained which varies between +3 and −3 volts for X between 0 and 1023.

The count in storage register 19 is compared digitally in comparator 23 with a preset count placed in a depth reference register 24. The count in register 24 represents the depth (in meters) at which the undersea vehicle is to travel and this depth can be changed, as will be hereinafter described. When the count in register 19 is less than the count in register 24, indicating that the measured depth is less than the preset depth, the output of the digital to analog converter 21 is clamped to 0 volts by digital comparator 23. This causes the depth control signal to go to +12 volts thereby saturating the vehicle's depth control system in the "down" direction. Similarly, when the count in register 19 is greater than the count in register 24, indicating that the measured depth is greater than the preset depth, the output of the digital to analog converter 21 is clamped to +4 volts by digital comparator 23, causing the depth control signal to go to −12 volts. This causes the vehicle's depth control system to be switched to the "up" direction. When the count in register 19 equals the count in register 24, indicating that the measured depth is close to the preset depth, the digital comparator output is "open", allowing the output of converter 21 to vary linearly with X. Because of the DC level shift introduced by amplifier 22, the depth control (error) signal is 0 when X=512.

Four sets of switches, 31, 32, 33, and 34 are provided for setting different counts into register 24. Switch 31 is permanently wired to provide a count in register 24 which represents 0 pressure and is used as a testing channel. Switches 32, 33, and 34 are each sets of eight binary weighted, single pole, double-throw switches, which are used to select, prior to launch of the underwater vehicle, three different operating depths. It should be understood, of course, that if a greater number of operating depths are desired, it is merely necessary to add additional binary switches. Switches 31, 32, 33 and 34 are connected through gates 35, 36, 37 and 38, respectively, to register 24 and the opening of the desired gate is controlled by a receiver and decoder 39, which receives an acoustic depth command from a surface vessel.

OPERATION

Prior to diving, switches 32, 33, and 34 are first set for the desired depth. By way of example, in a recent dive of a Self-Propelled Underwater Research Vehicle (SPURV) operated by the Applied Physics Laboratory, University of Washington, depths of 420 meters, 732 meters, and 1495 meters were chosen as the operating depths. Pressure transducer 11 is used as the basic pressure-sensing element is transducer 11 provides an output frequency ($f_v$) proportional to depth. By way of example, a Vibrotron recently used on the SPURV had the following output:

| $f_v$ | Depth (meters) | Pressure (p.s.i.) |
|---|---|---|
| 25,200 | 0 | 0 |
| 25,138.9 | 43.0 | 62.8 |
| 24,862.2 | 213.9 | 312.3 |
| 24,658.7 | 338.4 | 494.0 |
| 24,458.5 | 459.8 | 671.4 |
| 19,972.2 | 2916.0 | 4257.4 |

Referring now to FIGURE 2 of the drawing, there are shown graphs of the outputs from amplifier 22, comparator 23, and storage register 18. With the operating depth being 102 meters less than the preset depth, the count in register 19 will be less than the count in register 24 and comparator 23 will cause the output of converter 21 to be clamped to 0 volts. This causes the depth control signal (output of amplifier 22) to go to +12 volts, thereby saturating the SPURV depth control system in the "down" direction. It can be seen in FIG. 2 of the drawing, that this condition continues until the deviation from the preset depth is −34 meters. At this depth, the count in registers 19 and 24 will be equal and the connection between comparator 23 and converter 21 will be "open", and the output from amplifier 22 will vary linearly with the output (X) of storage register 18. The depth control output signal will vary between +3 volts and −3 volts when X varies between 0 and 1023.

When the operating depth deviation becomes greater than 34 meters, the count in register 19 will be greater than the count in register 24 and the output of converter 21 will be clamped to +4 volts thereby generating a −12 volt depth control signal which will saturate the SPURV depth control system in the "up" direction.

I claim:

1. A depth control system for an underwater vehicle comprising:
    a pressure transducer providing a frequency output proportional to water depth,
    a first gate,
    means for periodically opening said first gate,
    a first binary counter for registering a fixed number of counts, said binary counter being connected through said first gate to the output of said pressure transducer,
    a second gate receiving opening and closing commands from said first binary counter,
    first and second storage registers,
    a crystal oscillator providing a frequency output, means for connecting said frequency output to said first and second storage registers through said second gate,
    a reference storage register for storing a digital count representing a preselected water depth,
    comparator means for comparing the count in said first storage register with the count in said reference storage register and providing an output signal when said counts are unequal,
    converter means connected to the output of said second storage means for providing an analog output signal proportional to the count stored in said second storage means, and
    means connected to the outputs of both said comparator means and said converter means for providing an analog depth control signal for controlling said vehicle.

2. A depth control system for an underwater vehicle as set forth in claim 1 having a plurality of binary switches connected through separate switch gates to said reference storage register and having means for selectively opening said switch gates whereby different counts representing different preselected water depths can be switched into said reference storage register.